(12) United States Patent
Ahrenfeldt et al.

(10) Patent No.: US 11,187,458 B2
(45) Date of Patent: Nov. 30, 2021

(54) SLURRY DRYING PLANT, A METHOD FOR DRYING SLURRY AND USE OF A SLURRY DRYING PLANT

(71) Applicants: Danmarks Tekniske Universitet, Kgs. Lyngby (DK); AquaGreen License ApS, Tisvildeleje (DK)

(72) Inventors: Jesper Ahrenfeldt, Frederiksværk (DK); Ulrik Birk Henriksen, Søborg (DK); Claus Thulstrup, Tisvildeleje (DK)

(73) Assignees: Danmarks Tekniske Universitet, Kgs. Lyngby (DK); AquaGreen License ApS, Tisvildeleje (DK)

( * ) Notice: Subject to any disclaimer, the term of this patent is extended or adjusted under 35 U.S.C. 154(b) by 214 days.

(21) Appl. No.: 16/485,332

(22) PCT Filed: Feb. 9, 2018

(86) PCT No.: PCT/EP2018/053315
§ 371 (c)(1),
(2) Date: Aug. 12, 2019

(87) PCT Pub. No.: WO2018/146265
PCT Pub. Date: Aug. 16, 2018

(65) Prior Publication Data
US 2019/0376742 A1    Dec. 12, 2019

(30) Foreign Application Priority Data

Feb. 13, 2017 (EP) ...................................... 17155818

(51) Int. Cl.
*F26B 3/06* (2006.01)
*F26B 17/20* (2006.01)
(Continued)

(52) U.S. Cl.
CPC ................. *F26B 3/06* (2013.01); *F26B 17/20* (2013.01); *B65G 33/18* (2013.01); *B65G 33/30* (2013.01);
(Continued)

(58) Field of Classification Search
CPC .......... F26B 3/06; F26B 17/20; F26B 21/005; F26B 2200/18; F26B 23/02; B65G 33/18; B65G 33/30
(Continued)

(56) References Cited

U.S. PATENT DOCUMENTS 3,950,230 A * 4/1976 Greenfield ............... B01D 1/14
203/47
5,246,599 A 9/1993 Aicher
(Continued)

FOREIGN PATENT DOCUMENTS

CA  2968244 A1 * 5/2016 ........... B09B 3/0016
CN  201155907 Y  11/2008
(Continued)

OTHER PUBLICATIONS

Machine translation of the Chinese Office Action dated Mar. 30, 2020 for Chinese patent application No. 201880011669.7, a counterpart foreign application of U.S. Appl. No. 16/485,332, 10 pages.
(Continued)

*Primary Examiner* — Stephen M Gravini
(74) *Attorney, Agent, or Firm* — Lee & Hayes, P.C.

(57) ABSTRACT

Disclosed is a slurry drying plant (1) comprising a slurry inlet (2) for feeding slurry to the slurry drying plant (1) and two or more meshing screw conveyors (3, 4) arranged to at least partly divide the slurry while conveying the slurry in a transport direction from the slurry inlet (2) to a slurry outlet (5). The slurry drying plant (1) further includes slurry heating means (6) comprising means for passing super-
(Continued)

Figure 1:
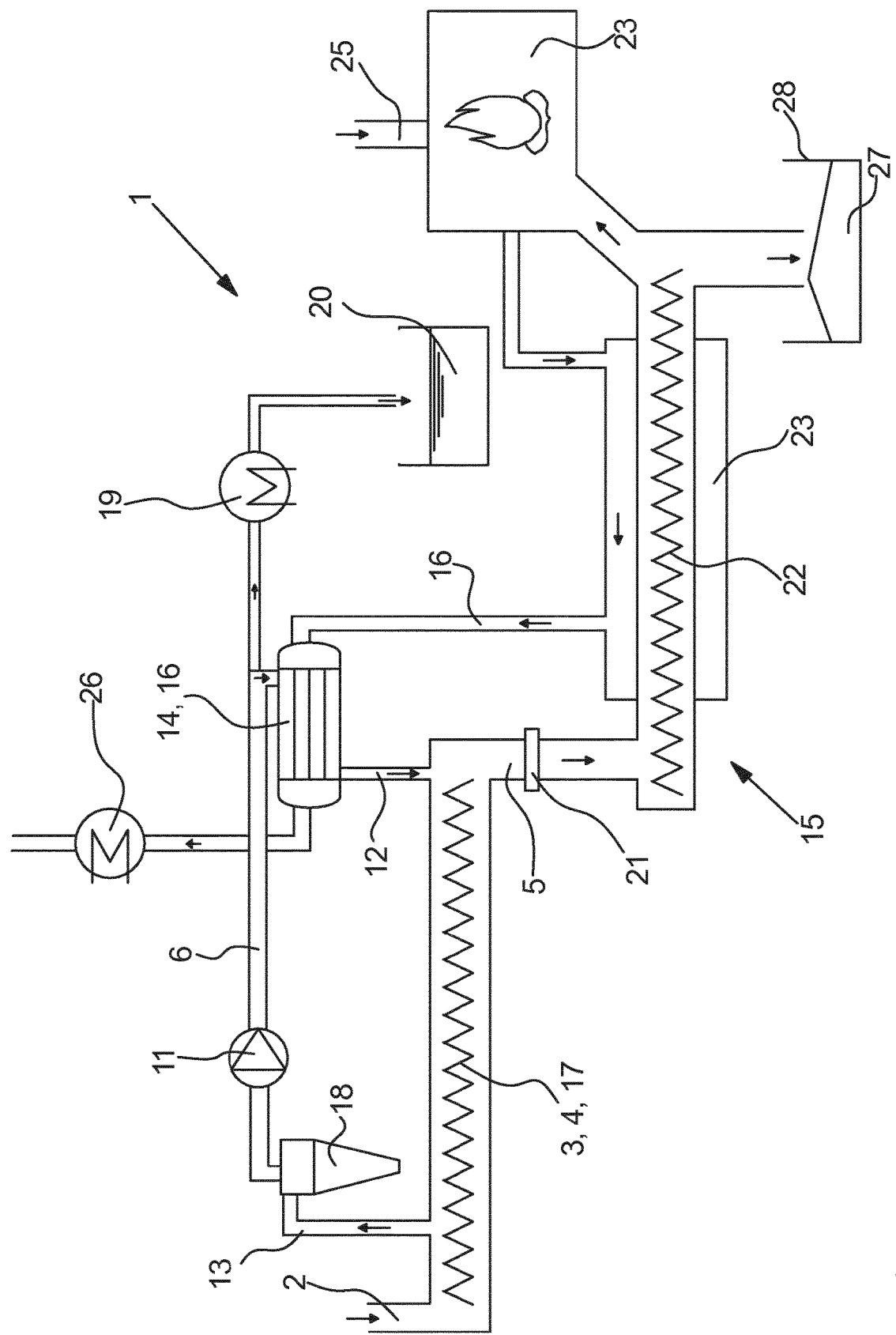

heated steam substantially at atmospheric pressure past the slurry and the two or more meshing screw conveyors (3, 4), while they are conveying the slurry. Furthermore, a method for drying slurry and use of a slurry drying plant (1) is disclosed.

15 Claims, 2 Drawing Sheets

(51) Int. Cl.
*B65G 33/18* (2006.01)
*B65G 33/30* (2006.01)
*F26B 21/00* (2006.01)
*F26B 23/02* (2006.01)

(52) U.S. Cl.
CPC ............ *F26B 21/005* (2013.01); *F26B 23/02* (2013.01); *F26B 2200/18* (2013.01)

(58) Field of Classification Search
USPC .......................................................... 34/166
See application file for complete search history.

(56) References Cited

U.S. PATENT DOCUMENTS

| | | |
|---|---|---|
| 5,589,140 A | 12/1996 | Takahashi |
| 2014/0109468 A1* | 4/2014 | Dam-Johansen ......... C10L 5/16 44/568 |
| 2014/0115956 A1* | 5/2014 | Dam-Johansen ....... C10L 5/363 44/589 |
| 2014/0190792 A1 | 7/2014 | Moriyama |
| 2017/0342233 A1* | 11/2017 | Oliveira .............. C22B 21/0069 |
| 2019/0376742 A1* | 12/2019 | Ahrenfeldt ................ F26B 3/06 |
| 2021/0094851 A1* | 4/2021 | Vangsgaard ............ C02F 3/302 |

FOREIGN PATENT DOCUMENTS

| | | | |
|---|---|---|---|
| CN | 102183133 A | 9/2011 | |
| CN | 106247780 A | 12/2016 | |
| EP | 1477461 A1 | 11/2004 | |
| EP | 2511637 A1 | 10/2012 | |
| EP | 3222657 A1 * | 9/2017 | .............. C08J 11/06 |
| EP | 3361198 A1 * | 8/2018 | ................ F26B 3/06 |
| KR | 20110004601 A | 1/2011 | |
| WO | WO2006/024696 A1 | 3/2006 | |
| WO | WO2006/066096 A2 | 6/2006 | |
| WO | WO2014/113894 A1 | 7/2014 | |
| WO | WO-2016077904 A1 * | 5/2016 | ........... B09B 3/0016 |
| WO | WO-2018146265 A1 * | 8/2018 | .............. F26B 17/20 |

OTHER PUBLICATIONS

The CN Search Report dated Mar. 23, 2020 for CN applicaiton No. 201880011669.7, 2 pages.
The PCT International Search Report dated Jun. 5, 2018 for PCT application No. PCT/EP2018/053315, 10 pages.

* cited by examiner

SLURRY DRYING PLANT, A METHOD FOR DRYING SLURRY AND USE OF A SLURRY DRYING PLANT

CROSS REFERENCE TO RELATED APPLICATIONS

This application is a U.S. National Phase Application of International Application No. PCT/EP2018/053315 filed Feb. 9, 2018, which claims priority to EP Application No. 17155818.2 filed Feb. 13, 2017, both of which are incorporated herein by reference in their entirety.

FIELD OF THE INVENTION

The invention relates to a slurry drying plant comprising a slurry inlet for feeding slurry to the slurry drying plant. The invention further relates to a method for drying slurry and use of a slurry drying plant.

BACKGROUND OF THE INVENTION

Organic slurry such as slurry from sewage treatment, farming, aquaculture, biochemical production, food production or other is problematic in that it is difficult and expensive to handle, store and dispose, it can contain drug residues, virus or other and it can emit bad smells or environmentally damaging gasses such as ammonium.

A solution would be to dry the slurry to reduce or even substantially removed the water content of the slurry to reduce or even completely eliminate the abovementioned problems.

Thus, from the US patent application US 2014/0190792 A1 a dryer for drying sludge by means of two screw conveyers formed by a number of blades is known. Superheated steam is guided through the hollow shafts of the conveyers and dry hot air is circulated around the conveyers. But such a dryer design is expensive to manufacture and run.

It is therefore an object of the present invention to provide for a cost-efficient technique for drying slurry.

THE INVENTION

The invention provides for slurry drying plant comprising a slurry inlet for feeding slurry to the slurry drying plant and two or more meshing screw conveyors arranged to at least partly divide the slurry while conveying the slurry in a transport direction from the slurry inlet to a slurry outlet. The slurry drying plant further includes slurry heating means comprising means for passing superheated steam substantially at atmospheric pressure past the slurry and the two or more meshing screw conveyors, while they are conveying the slurry.

Making the screw conveyors mesh is advantageous in that it hereby is possible to knead and divide the slurry during the conveying process and thus ensure a larger heat transferring surface and a better distribution of the heat in the slurry—which in turn all will lead to a faster and more efficient drying process. However, it should be noted that the term "meshing" in this context include both that the conveyers actually touches and it includes that the conveyers are almost touching—i.e. spaced at least slightly apart. I.e. the term "meshing" merely refers to the fact that the outer periphery of the helical screw blades of the conveyers are overlapping as seen in the direction of a plane perpendicular to the longitudinal direction of the screw conveyers.

Furthermore, providing the slurry drying plant with heating means arranged to pass superheated steam (at atmospheric pressure) past the slurry and the conveyors during the conveying process is advantageous in that hereby a very efficient and fast heating process can be achieved. And by letting the superheated steam be in direct contact with the slurry efficient drying is ensured and when subsequently condensing the steam, the surplus heat can be reused in the slurry drying plant or e.g. fed to a central heating system.

It should be emphasised that the term "slurry" is to be understood as any kind of organic liquid manure, fertilizer, sludge or similar liquids or semi-liquids in the form of a watery mixture of primarily insoluble matter i.e. a thick mixture of liquid and another at least substantially solid substance.

Furthermore, in this context the term "slurry heating means" should be understood as any kind of heater, oven, furnace, boiler, heat exchanger, heat blower or other or any combination thereof or any other kind of slurry heater suitable for heating slurry by passing superheated steam substantially at atmospheric pressure past the slurry and the two or more meshing screw conveyors.

Also, in this context the term "superheated steam substantially at atmospheric pressure" should be understood as the superheated steam being just around the exact atmospheric pressure of the surroundings. Thus, this term does include that the internal steam pressure inside slurry drying plant is slightly higher or slightly lower—such as +/−0.002 Bar or +/−0.006 Bar.—than the exact atmospheric pressure of the surroundings.

In an aspect of the invention, the two or more meshing screw conveyors comprise a first screw conveyor including a first screw conveyer helical blade running in a first direction around a first screw conveyor rotational axis, wherein the first screw conveyor is meshing with a second screw conveyor including a second screw conveyor helical screw blade running in a second direction around a second screw conveyor rotational axis and wherein the first direction is opposite the second direction.

Forming the screw conveyers with helical screw blade running in opposite direction is advantageous in that it enables a more uniform and centralised transportation and slurry division.

In an aspect of the invention, the first screw conveyer helical blade and the second screw conveyor helical screw blade are substantially continuous in the active length of said two or more meshing screw conveyors.

Forming each of the helical screw blades as a single continuous blade is advantageous in that it ensures a simpler and more inexpensive screw conveyer design.

In an aspect of the invention, the first screw conveyer helical blade and the second screw conveyor helical screw blade have substantially constant pitch in the active length of said two or more meshing screw conveyors.

Forming each of the helical screw blades with substantially constant uniform pitch is advantageous in that it ensures a simpler and more inexpensive screw conveyer design.

In an aspect of the invention, the first screw conveyor is arranged to rotate in the opposite direction of the second screw conveyor.

Hereby is achieved an advantageous embodiment of the invention.

In an aspect of the invention, slurry heating means comprises flow means arranged to let the superheated steam flow past the slurry and the two or more meshing screw conveyors substantially in the opposite direction of the transport direction.

Letting the steam flow in the opposite direction of the slurry is advantageous in that the driest and hottest steam thereby will contact the slurry just before it reaches the slurry outlet—thus ensuring a more efficient drying process.

It should be emphasised that the term "flow means" is to be understood as any kind of piping, fan, blower, duct or similar or any combination thereof or any other kind of steam flow generator suitable for generating a steam flow past the slurry and the two or more meshing screw conveyors in the slurry drying plant.

In an aspect of the invention, the flow means comprises a steam inlet for the superheated steam arranged at the slurry outlet and a steam outlet for the superheated steam arranged at the slurry inlet.

Hereby is achieved an advantageous embodiment of the invention.

In an aspect of the invention, the slurry heating means comprises steam heating means for heating the superheated steam to an entrance temperature of between 110° C. and 400° C., preferably between 130° C. and 300° C. and most preferred between 150° C. and 250° C.

If the entrance temperature—i.e. the temperature of the steam when it enters the area around the screw conveyers and first come in contact with the slurry—of the superheated steam is too high a torrefaction or pyrolysis process will commence, thus generating highly flammable gasses, poisonous gasses or other dangerous or damaging by-products which are not easy to handle when mixed the superheated steam. However, if the entrance temperature is too low the drying process will be inefficient and the capacity of the slurry drying plant is reduced. Thus, the present temperature ranges present an advantageous relationship between safety and efficiency.

It should be emphasised that the term "steam heating means" is to be understood as any kind of heat exchanger, boiler, heat pump or other or any other kind of steam heater suitable for heating steam in a slurry drying plant.

In an aspect of the invention, the slurry drying plant further comprises a subsequent thermal processing device in which slurry leaving the slurry outlet is burned or pyrolyzed.

By subsequently putting the dried slurry through a combustion process or a pyrolysis process is advantageous in that the slurry hereby can be reduced to substantially harmless coke which is free from virus and drug residues and therefore can be used as fertilizer. Furthermore, the coke is easy to handle and store.

And it is advantageous to conduct this combustion process or pyrolysis process in a subsequent substantially separate thermal processing device in that the flue gas or other generated gasses can be easier and more efficiently handled when being separate from the superheated steam.

It should be noted that in this context the term "pyrolysis process" or "pyrolyzed" also covers torrefaction which is a mild form of pyrolysis at temperatures typically between 200 and 320° C. depending on the specific slurry.

In an aspect of the invention, the slurry drying plant further comprises heat transferring means for transferring heat generated in or by the subsequent thermal processing device to the superheated steam.

A subsequent combustion process or pyrolysis process will generate much heat (when burning the flammable gasses generated in the pyrolysis process). And since producing the superheated steam requires much heat it is advantageous to transfer the generated heat and thereby reduce or avoid consumption of external power to generate the superheated steam.

It should be emphasised that the term "heat transferring means" is to be understood as any kind of heat exchanger, piping, blower or other or any combination thereof or any other kind of heat transferor suited for transferring heat generated in or by the subsequent thermal processing device to the superheated steam.

In an aspect of the invention, the first screw conveyor rotational axis and the second screw conveyor rotational axis are substantially parallel.

Arranging the screw conveyors with substantially parallel rotational axis is advantageous in that it ensures a simpler and more inexpensive slurry drying plant design.

In an aspect of the invention, the slurry drying plant comprises a dewatering device arranged to reduce the water content in the slurry before it enters the slurry inlet.

In an aspect of the invention, the slurry drying plant further comprises a pressure regulating pump arranged to maintain a steam pressure inside the slurry drying plant substantially at atmospheric pressure.

The evaporation during the drying process could increase the pressure inside the slurry drying plant and a subsequent condensation of the steam could decrease the pressure inside the slurry drying plant and it is therefore advantageous to provide the slurry drying plant with a pressure regulating pump arranged to constantly ensure that the pressure inside the slurry drying plant is maintained substantially at the atmospheric pressure of the surroundings.

In an aspect of the invention, the pressure regulating pump is arranged to maintain the steam pressure inside the slurry drying plant down to 0.005 Bar and preferably down to 0.001 Bar below the exact atmospheric pressure.

The drying process can generate bad smells or even dangerous gasses and it is therefore advantageous if the pressure inside the slurry drying plant is maintained slightly below the the exact atmospheric pressure of the surroundings, to substantially prevent steam or gasses to escape the slurry drying plant through unwanted routes or passages.

The invention further provides for a method for drying slurry. The method comprises the steps of:
- conveying the slurry from a slurry inlet to a slurry outlet by means of two or more meshing screw conveyors,
- divide at least a part of the slurry by means of the two or more meshing screw conveyors during the conveying process,
- drying the slurry by guiding superheated steam substantially at atmospheric pressure past the slurry and the two or more meshing screw conveyors during the conveying process and the dividing process so that the superheated steam is in direct contact with at least a part of the slurry and at least parts of the two or more meshing screw conveyors.

Dividing the slurry and tumbling it around by the screw conveyers during the transportation and at the same time passing superheated steam past the slurry and the meshing screw conveyors is advantageous in that this combination ensures a fast and efficient drying process.

In an aspect of the invention, the method further comprises the step of leading slurry from the slurry outlet to a subsequent thermal processing device in which the slurry will be burned or pyrolyzed.

Subsequently processing the slurry in a thermal processing device is advantageous in that this process hereby can run separately from the initial drying process.

In an aspect of the invention, the method further comprises the step of transferring heat generated in or by the subsequent thermal processing device to the superheated steam.

By utilizing the generated heat in the drying process a very energy efficient slurry drying plant and method is provided.

In an aspect of the invention, the method is performed by means of a slurry drying plant according to any of the previously discussed slurry drying plants.

Hereby is achieved an advantageous embodiment of the invention.

The invention also provides for use of a slurry drying plant according to any of the previously discussed slurry drying plants for drying slurry having a solid matter content above 2%, preferably above 5% and most preferred above 10%.

If the solid matter content in the slurry is too low the slurry is difficult to handle in the screw conveyers and it is therefore advantageous to ensure that the solid matter content of the slurry is above a certain level to ensure that the viscosity of the slurry is sufficiently high.

FIGURES

Figure 2:
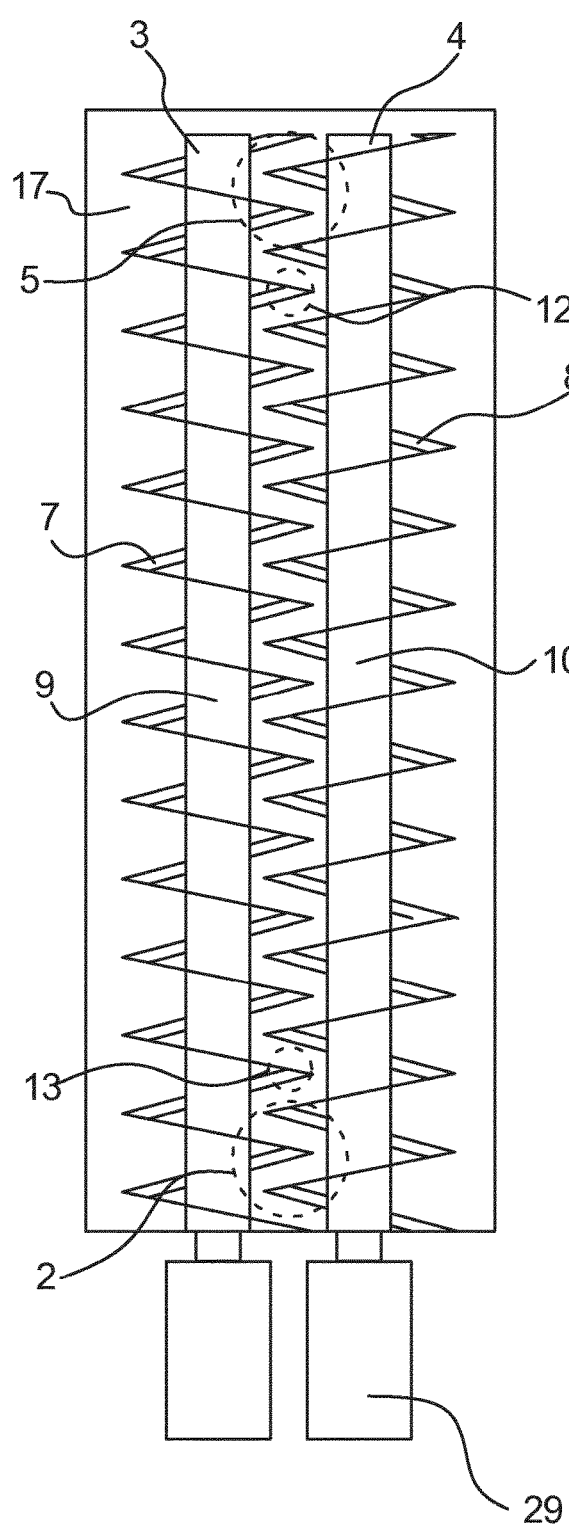
Figure 3:
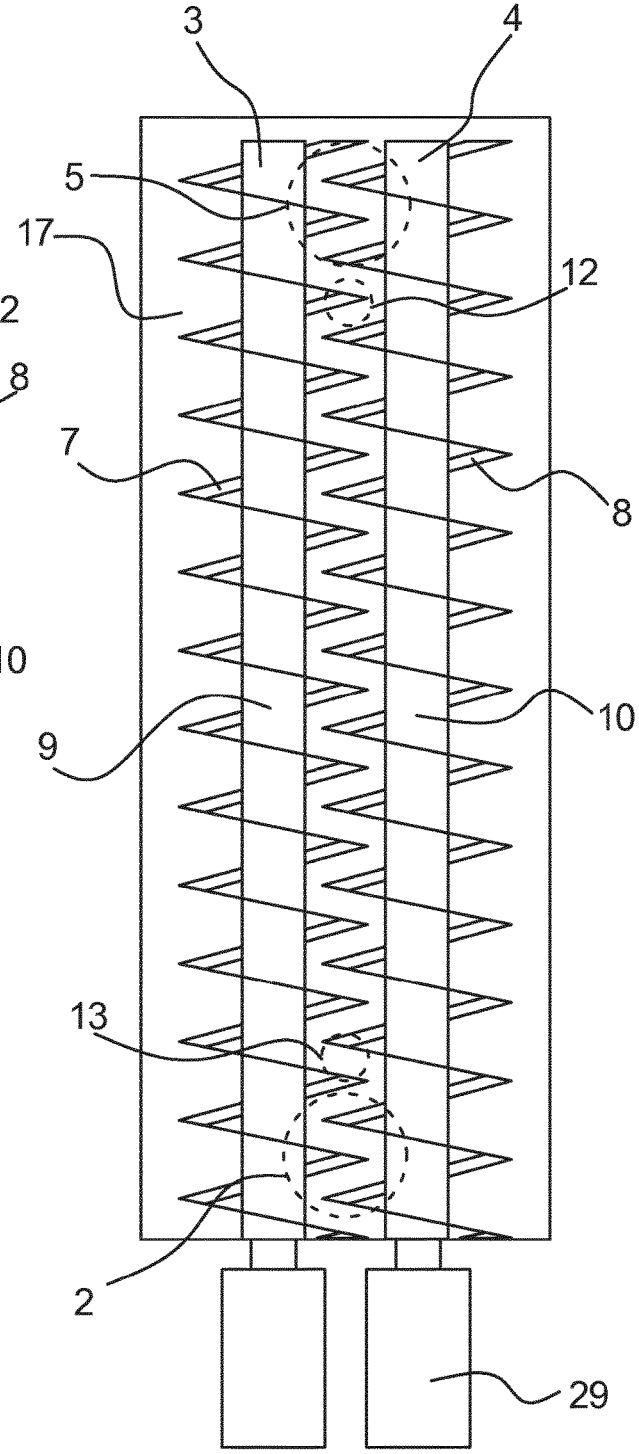

The invention will be described in the following with reference to the figures in which FIG. 1. illustrates an embodiment of a slurry drying plant, as seen from the side, FIG. 2 illustrates two meshing screw conveyers with helical blades running in opposite direction, as seen from the top, and FIG. 3 illustrates two meshing screw conveyers with helical blades running in the same direction, as seen from the top.

DETAILED DESCRIPTION

FIG. 1 illustrates an embodiment of a slurry drying plant 1, as seen from the side.

In this embodiment of the invention slurry drying plant 1 comprises two meshing screw conveyors 3, 4 arranged in a screw conveyer chamber 17 as will be discussed in more details in relation with FIGS. 2 and 3. The screw conveyer chamber 17 further comprises a slurry inlet 2 arranged at one end of the chamber 17 and a slurry outlet 5 arranged at the opposite end of the chamber 17.

The slurry drying plant 1 further comprises slurry heating means 6 arranged to pass superheated steam past slurry and the two meshing screw conveyors 3, 4 while they are conveying the slurry. In this embodiment the slurry heating means 6 is arranged to circulate steam through a steam inlet 12, along through the screw conveyer chamber 17, out through a steam outlet 12, through a cyclone device 18, through flow means 11, through steam heating means 14 and out through the steam inlet 12 again. I.e. in this embodiment at least most of the steam is circulating but in another embodiment only little of the steam or even none of the steam would be circulating.

In this embodiment the flow means 11 is arranged to direct the superheated steam flow through the screw conveyor chamber 17 in the opposite direction of the transport direction of the slurry—i.e. from the steam inlet 12 to the steam outlet 13. But in another embodiment the steam could be arranged to flow in the opposite direction, it could be arranged to flow transversal to the transport direction or the screw conveyor chamber 17 could also or instead comprise more than one steam inlet 12 and/or more than one steam outlet 13.

Besides the steam inlet 12 and the steam outlet 13 the flow means 11 does in this embodiment comprise an electrically powered blower but in another embodiment the steam flow could also or instead be generated by a fan, a pump, convection or other.

In this embodiment the steam is also guided through a cyclone device 18 arranged to catch impurities in the steam flow. However, in another embodiment the slurry drying plant 1 would not comprise a cyclone device 18 or the slurry drying plant 1 would also or instead comprise a filter, a sieve or another device for cleaning the steam flow.

In this embodiment the steam heating means 14 is formed by a heat exchanger providing heat to the steam from a succeeding thermal processing device 15 but in another embodiment the steam heating means 14 could also or instead comprise an electric heating device, a combustion heating device, a heat exchanger arranged to exchange heat with an external heat source or other.

In this embodiment the slurry is entering the slurry drying plant 1 directly through the slurry inlet 2. However, in another embodiment the slurry drying plant 1 could further comprise a dewatering device (not shown) arranged to reduce the water content in the slurry before it enters the slurry inlet 2 e.g. to ensure that the solid matter content in the slurry is sufficiently high, to ensure that the viscosity of the slurry is sufficiently high, to ensure a more efficient drying process or other.

As the slurry constantly will generate more steam during the drying process through evaporation, surplus steam is constantly generated. The surplus steam could be lead out of the system by means of a pressure control valve, a safety valve or some other discharge arrangement but in this embodiment the slurry drying plant 1 further comprises a condensing device 19 through which the surplus steam is guided. In the condensing device 19 the surplus steam is condensed at a temperature of around 100° C. so that the generated heat can be used for facility heating, it can be used in other heat consuming processes, it can be supplied to an external district heating system or other. In a preferred embodiment the condensing device 19 would comprise several condensing steps to avoid clogging the condensing device 19 with impurities in the steam.

The condensed water is in this embodiment lead to a water reservoir 20.

In this embodiment, a pressure regulating pump 30 is arranged in succession of the condensing device 19 to pump gasses out of the slurry drying plant 1 to ensure that the steam pressure inside the slurry drying plant 1 is maintained substantially at atmospheric pressure. In fact, in this embodiment the pressure regulating pump 30 is arranged to maintain the steam pressure inside the slurry drying plant 1 substantially at the atmospheric pressure of the surroundings by maintaining the steam pressure at around 0.0005 Bar below the exact atmospheric pressure of the surroundings. However, in another embodiment the pressure regulating pump 30 could be arranged to maintain the steam pressure inside the slurry drying plant 1 substantially exactly at atmospheric pressure or slightly above atmospheric pressure. Also, in another embodiment the pressure regulating pump 30 could also or instead be located differently in the slurry drying plant 1 such as directly in relation with the screw conveyer chamber 17, the condensing device 19, the slurry heating means 6 or other. The dried slurry leaving the slurry outlet 5 could now be stored, distributed on a field or other but in this embodiment the slurry drying plant 1 further comprises a thermal processing device 15 which in this embodiment is arranged in direct succession of the screw conveyer chamber 17 so that the slurry is already hot when entering the thermal processing device 15. However, in another embodiment the thermal processing device 15 could be arranged distant from the screw conveyer chamber 17 or the thermal processing device 15 and the screw conveyer chamber 17 could be formed integrally.

In this embodiment the slurry entering the thermal processing device 15 first passes through an airlock 21 ensuring that flue gasses and other does not escape back to the screw conveyer chamber 17.

In the thermal processing device 15 the dried slurry is in this embodiment put through a pyrolysis process, in that the slurry is transported through a screw conveyer arrangement 22 similar to the arrangement describes in FIGS. 2 and 3. However, in another embodiment the dried slurry could also or instead be transported through the thermal processing device 15 by means of a single screw conveyer, a fire resistant conveyer belt, gravity or other.

Pyrolysis is a thermochemical decomposition of the organic material in the slurry at elevated temperatures in the absence of oxygen (or any halogen) thereby charring the organic material. How much the temperatures have to be elevated is depending on the specific slurry but in this case the pyrolysis process takes place at around 350° C.

In this embodiment the slurry is heated by means of hot flue gas being lead through a mantle 23 enclosing the thermal processing device 15. However, in another embodiment the slurry could also or instead be heated by means of an electric heating device, a combustion heating device, a heat exchanger or other.

The pyrolysis process in the thermal processing device 15 generates highly combustible pyrolysis gasses which are lead to a combustion chamber 24 in which the gas is combusted during the supply of air through an air inlet 25, and the hot flue gas is lead through the mantle 23 to supply the heat needed to run the pyrolysis process.

In this embodiment slurry drying plant 1 comprises heat transferring means 16 for transferring the still very hot gas that has passed through the mantle 23 to the steam heating means 14 in which the heat is used for generating superheated steam. In this embodiment the steam heating means 14 and the heat transferring means 16 are the same heat exchanger but in another embodiment these processes could at least partly take place separately. Also, in another embodiment the heat of the gas leaving the mantle 23 could be used for another purpose.

After having passed through the steam heating means 14 the gas will in this embodiment be lead through a flue gas heat exchanger 26 by means of which the remaining heat in the flue gas is extracted.

The pyrolysis process in the thermal processing device 15 also generates a pyrolyzed bio-coke material 27 which is now biologically inactive, odorless and easy to store.

And at the same time the weight of the bio-coke material 27 is now reduced to around a tenth of the weight of the slurry entering the slurry drying plant 1.

In this embodiment the bio-coke material 27 is lead to a collection tank 28 from which it can be used as a fertilizer, as a soil improver, for carbon sequestration or other.

In another embodiment the thermal processing device 15 could also or instead be arranged to combust at least parts of the dried slurry so that the heat generated in this combustion process could be lead to the steam heating means 14 in which the heat is used for generating superheated steam.

FIG. 2 illustrates two screw conveyers 3, 4 with helical blades 7, 8 running in opposite direction, as seen from the top.

In this embodiment the slurry drying plant 1 comprises two meshing screw conveyors 3, 4 arranged to divide some of the slurry while conveying it in a transport direction from the slurry inlet 2 to the slurry outlet 5. However, in another embodiment the slurry drying plant 1 could comprise more meshing screw conveyers 3, 4 either meshing in pairs, quartets or other, arranged in layers, arranged side-by-side and/or other.

In this embodiment the screw conveyers 3, 4 are each provided with drive means 29 in the form of electrical motors. However, in another embodiment more screw conveyers 3, 4 could be driven by the same drive means 29 and/or the drive means could be of another type.

In this embodiment the first screw conveyer helical blade 7 of the the first screw conveyor 3 is running in a first direction around the first screw conveyor rotational axis 9 and the second screw conveyor helical screw blade 8 of the second screw conveyor 4 is running in a second direction around the second screw conveyor rotational axis 10, wherein the first direction is opposite the second direction. Thus, in this embodiment the first screw conveyor 3 is arranged to rotate in the opposite direction of the second screw conveyor 4 to generate the correct transporting motion of the screw conveyers 3, 4.

FIG. 3 illustrates two screw conveyers 3, 4 with helical blades 7, 8 running in the same direction, as seen from the top.

In this embodiment the two screw conveyers 3, 4 are substantially identical. Thus, to make the meshing screw conveyers 3, 4 generate the correct transporting motion and at the same time ensure that the slurry is guided in between the two screw conveyers 3, 4 to be divided in the process, the first screw conveyer 3 is in this embodiment arranged to rotate in the same direction as the second screw conveyer 4.

In the embodiments disclosed in FIGS. 2 and 3 the first screw conveyer helical blade 7 and the second screw conveyer helical blade 8 are both formed as substantially continuous segments with constant and uniform pitch and diameter in the active length of the two or more meshing screw conveyors 3, 4 i.e. in this case in the full length of the helical screw blades 7, 8. However, in another embodiment one or more of the helical screw blades 7, 8 could be formed at least partly with variable pitch, tapering outer diameter, ribbon segments or other or any combination thereof.

The invention has been exemplified above with reference to specific examples of slurry drying plant 1, screw conveyors 3, 4, slurry heating means 6 and other. However, it should be understood that the invention is not limited to the particular examples described above but may be designed and altered in a multitude of varieties within the scope of the invention as specified in the claims.

LIST

1. Slurry drying plant
2. Slurry inlet
3. First screw conveyor
4. Second screw conveyor
5. Slurry outlet
6. Slurry heating means
7. First screw conveyer helical blade
8. Second screw conveyor helical screw blade
9. First screw conveyor rotational axis
10. Second screw conveyor rotational axis 11. Flow means
12. Steam inlet
13. Steam outlet
14. Steam heating means
15. Thermal processing device
16. Heat transferring means
17. screw conveyer chamber
18. Cyclone device
19. Condensing device
20. Water reservoir
21. Airlock
22. Screw conveyer arrangement
23. Mantle
24. Combustion chamber
25. Air inlet
26. Flue gas heat exchanger
25. Air inlet
27. Bio-coke material
28. Collection tank
29. Drive means
30. Pressure regulating pump

The invention claimed is:

1. A slurry drying plant comprising:
a slurry inlet for feeding slurry to said slurry drying plant;
two or more meshing screw conveyors arranged to at least partly divide said slurry while conveying said slurry in a transport direction from said slurry inlet to a slurry outlet; and
a slurry heater for passing superheated steam substantially at atmospheric pressure past said slurry and said two or more meshing screw conveyors while the two or more meshing screw conveyors are conveying said slurry,
wherein said two or more meshing screw conveyors comprise a first screw conveyor and a second screw conveyor, said first screw conveyor meshing with said second screw conveyor.

2. The slurry drying plant according to claim 1, wherein said first screw conveyor includes a first screw conveyor helical blade running in a first direction around a first screw conveyor rotational axis, said second screw conveyor includes a second screw conveyor helical screw blade running in a second direction around a second screw conveyor rotational axis and wherein said first direction is opposite said second direction.

3. The slurry drying plant according to claim 2, wherein said first screw conveyor is arranged to rotate in an opposite direction of said second screw conveyor.

4. The slurry drying plant according to claim 1, wherein said slurry heater comprises a flow duct arranged to let said superheated steam flow past said slurry and said two or more meshing screw conveyors substantially in an opposite direction of said transport direction.

5. The slurry drying plant according to claim 4, wherein said flow duct comprises a steam inlet for said superheated steam arranged at said slurry outlet and a steam outlet for said superheated steam arranged at said slurry inlet.

6. The slurry drying plant according to claim 1, wherein said slurry heater comprises a steam heater for heating said superheated steam to an entrance temperature of between 110° C. and 400° C., between 130° C. and 300° C., or between 150° C. and 250° C.

7. The slurry drying plant according to claim 1, wherein said slurry drying plant further comprises a subsequent thermal processing device in which slurry leaving said slurry outlet is burned or pyrolyzed.

8. The slurry drying plant according to claim 7, wherein said slurry drying plant further comprises a heat transferrer or for transferring heat generated in or by said subsequent thermal processing device to said superheated steam.

9. The slurry drying plant according to claim 1, wherein said first screw conveyor rotational axis and said second screw conveyor rotational axis are substantially parallel.

10. The slurry drying plant according to claim 1, wherein said slurry drying plant further comprises a pressure regulating pump arranged to maintain a steam pressure inside said slurry drying plant substantially at atmospheric pressure.

11. The slurry drying plant according to claim 10, wherein said pressure regulating pump is arranged to maintain said steam pressure inside said slurry drying plant down to 0.005 Bar or down to 0.001 Bar below an exact atmospheric pressure.

12. A method for drying slurry, said method comprising:
conveying said slurry from a slurry inlet to a slurry outlet by two or more meshing screw conveyors;
divide at least a part of said slurry by said two or more meshing screw conveyors while conveying said slurry from said slurry inlet to said slurry outlet; and
drying said slurry by guiding superheated steam substantially at atmospheric pressure past said slurry and said two or more meshing screw conveyors during said conveying process and dividing at least said part of said slurry so that said superheated steam is in direct contact with at least a part of said slurry and at least parts of said two or more meshing screw conveyors,
wherein said two or more meshing screw conveyors comprise a first screw conveyor and a second screw conveyor, said first screw conveyor meshing with said second screw conveyor.

13. The method according to claim 12, further comprising:
leading said slurry from said slurry outlet to a subsequent thermal processing device in which said slurry will be burned or pyrolyzed.

14. The method according to claim 12, further comprising:
transferring heat generated in or by said subsequent thermal processing device to said superheated steam.

15. The method according to claim 12, wherein the slurry comprises a solid matter content above 2%, above 5%, or above 10%.

* * * * *